Oct. 17, 1950

V. KLÍMA

MULTIPLEX PARALLEL COMMUTATOR WINDING FOR COMMUTATOR APPARATUS 2,525,913

Filed Feb. 14, 1948

5 Sheets-Sheet 1

Inventor:
Vilém Klíma,
by [signature]

Oct. 17, 1950 V. KLÍMA 2,525,913

MULTIPLEX PARALLEL COMMUTATOR WINDING
FOR COMMUTATOR APPARATUS

Filed Feb. 14, 1948 5 Sheets-Sheet 2

Inventor:
Vilém Klíma
by Paul M. Smuska

Inventor:
Vilem Klíma
by [signature]

Oct. 17, 1950 V. KLÍMA 2,525,913

MULTIPLEX PARALLEL COMMUTATOR WINDING FOR COMMUTATOR APPARATUS

Filed Feb. 14, 1948 5 Sheets-Sheet 4

Inventor:
Vilém Klíma,
by Paul H. Smolka

Inventor:
Vilém Klíma,
by Paul H. Smolka

Patented Oct. 17, 1950

2,525,913

UNITED STATES PATENT OFFICE 2,525,913

MULTIPLEX PARALLEL COMMUTATOR WINDING FOR COMMUTATOR APPARATUS

Vilém Klíma, Prague, Czechoslovakia, assignor of one-half to Moravian Electrical Engineering Works, National Corporation, Olomouc, Czechoslovakia Application February 14, 1948, Serial No. 8,437
In Czechoslovakia September 27, 1946

Section 1, Public Law 690, August 8, 1946
Patent expires September 27, 1966

8 Claims. (Cl. 171—252)

This invention relates to commutator type A. C. or D. C. dynamo-electric machines, and more particularly, to a novel armature construction and winding arrangement particularly effective to reduce the segment voltage of such machines.

The invention is particularly applicable to dynamo-electric machines having commutator connected windings in which the number of parallel connected winding branches is greater than the number of poles. Such windings are used with high output machines to reduce the segment voltage.

In order to check the segment voltage, these windings need equalising connections of the first and second order, and to ensure good commutation, even connections of the third order, placed between the armature and the shaft connecting the back ends of the coils to the commutator. Such windings are expensive.

The present invention is directed to a novel commutator construction in which the advantageous reduction of segment voltage and attainment of good commutation possible with prior art windings are attained without the necessity of using expensive equalizing connections.

Thus, in the present invention, an armature of the normal length for a particular machine design is divided into equal length axially spaced sections, the slots of all sections being in longitudinal alignment with each other. Each winding is divided into a number of two winding sections equal to the number of armature sections and one winding section is applied to each armature section with the winding sections being connected in series with each other. In certain instances, two commutators may be provided, each on an armature section, with corresponding segments of the two commutators being longitudinally aligned.

Figure 1:
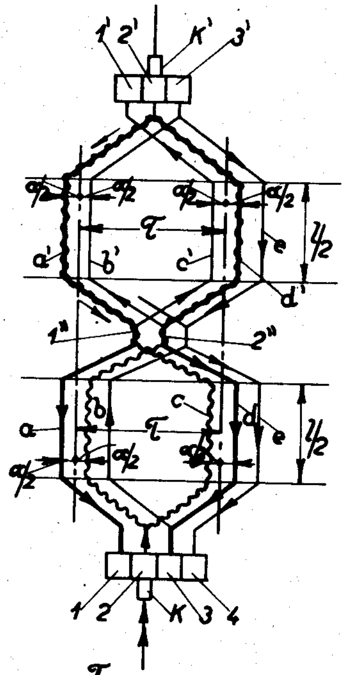
Fig. 1 is a schematic representation of an armature construction and a duplex parallel winding thereon, according to the invention.

Referring to Fig. 1, the armature is illustrated as comprising two axially spaced sections each having a length ½, where 1 is the length of a corresponding one-section armature. The stator is divided into the same number of axially spaced sections as the armature, each stator section having a length equal to, and being co-extensive with its associated armature section. The corresponding slots of both armature sections are longitudinally aligned, as are the corresponding segments 1, 2, 3, 4, etc. and 1', 2', 3', 4', etc., of the two commutators, each associated with one armature section. A brush K is operatively associated with one commutator and a brush K' with the other commutator.

Figure 2:
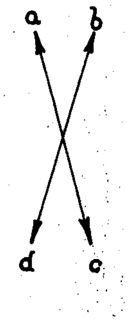
Fig. 2 is a voltage diagram corresponding to a winding branch of Fig. 1.
Figure 3:
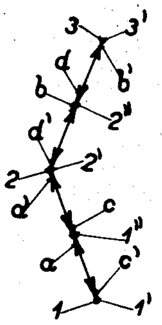
Fig. 3 is a vector voltage polygon of the winding of Fig. 1.

The winding arrangement includes two winding halves or sections $a=p$ connected in series. (In general with multiplex windings of $m$ windings $a=p$). One winding, e. g. a lap winding, of one bar per slot forms a circuit from segment 1, through conductors $+a—c$ to segment 2, then via conductors $+b—d$ to segment 3, etc. Conductors $a$ and $c$ are separated from each other by the pole distance $\tau$. So are conductors $b$ and $d$. The winding has thus a pitch $y=\tau$, where $\tau$ is the pole distance. Fig. 2 shows the voltage induced in conductors $a$, $b$, $c$, $d$. Fig. 3 shows the vector polygon of voltages. The segment voltage across segments 1, 2, 3 is represented by the distances $\overline{12}$, $\overline{23}$, etc. According to the invention a second parallel winding is connected to the back heads of the above mentioned winding. It is so designed that its voltages measured at the points which are connected to the back coil ends are equally great.

This second winding (Fig. 1) is formed by the circuit from segment 1′ through conductors $a'$ and $c'$ to segment 2′, via conductor $-d'$ to junction 2′′, via conductor $b'$ to segment 3′, etc.

Conductors $a'$, $b'$, $c'$, $d'$ are wound on an armature section of the same dimensions as the one on which conductors $a, b, c, d$ are wound, as both armature sections are obtained by dividing one original armature of length $l$ into two equal parts of lengths $l/2$ and spacing them from each other in an axial direction (see Fig. 1).

The voltage across conductors $a'$, $b'$, $c'$, $d'$ is equal to that across conductors $a, b, c, d$. As is evident from Fig. 3, the voltage across either winding measured at the points 1′′ and 2′′ is the same, so that the windings at the coil ends or junctions 1′′, 2′′ etc. can be connected to each other. The voltage of the closed circuit 1′′$-c+b$, 2′′$+d'-a'$1′′ therefore equals zero, this circuit being shown by a wavy line. As the voltage across segments 1, 2, 3 is equal to that across segments 1′, 2′, 3′, the brushes can also be connected in parallel. The voltages on both commutators are equal because, seen from the commutators, both windings have a full unreduced pitch and have the same positions in the magnetic field. Looking from the commutators, the winding $a, b, c, d$ is not crossed, the winding $c', a', d', b'$ is crossed.

If we send a current through the armature through brushes K and K′, the current will flow as shown by the arrows, e. g. from brush K through conductor $b$ to $d$, etc. and from brush K through conductors $c$ and $a$ etc. Similarly, current will flow from brush K′ via conductors $d'$ to $b'$ etc. and via conductors $a'$ to $c'$ etc. As the currents in all the conductors are equal, we can imagine that the current flows e. g. from segment 2 via $b$ and $b'$ to segment 3′, and via conductors $c'$ and $e$ to segment 4.

As will be seen, both windings together act like a duplex winding, as the path of the current leads from the second to the fourth segment and from the first to the third, i. e. to the segment next but one, as will be seen from the coils $a, a', d', d$, shown in thick straight lines.

Figure 4:
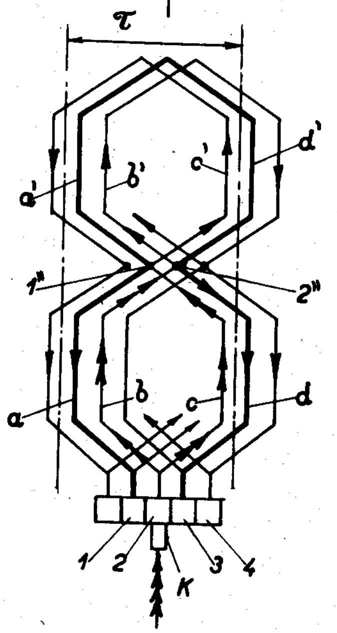
Fig. 4 is a view similar to Fig. 1, with one commutator and its brushes omitted.

If we omit brush K′ not much will change in the current distribution (see Fig. 4), as will be seen, conductor $b, c$ carries twice the current, but conductor $a', d'$ carries no current at all. The distribution of current in the other conductors is the same as in Fig. 1, although for this example we have chosen a brush narrower than one segment, whereas in practice a brush that is at least nearly two segments broad is used.

Figure 5:
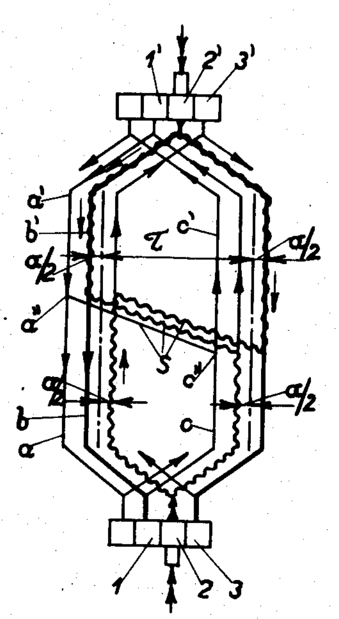
Fig. 5 illustrates a modified coil form of the winding of Fig. 1.

Fig. 5 illustrates an arrangement in which the front sides of the two windings are straightened out so that conductors $a$, $a'$ and $b$, $b'$, for example, are in longitudinal alignment and continuation of each other. That is, there is no offset in the portion between the two armature sections, of the conductors $a$ and $a'$, or $b$ and $b'$. Conductors $a$ and $a'$ are connected to conductors $c$ and $c'$ at the points $a''$ and $c''$, these points being connected by the short connectors $s$. The latter carry current only during commutation, and thus need to have only a relatively small cross-sectional area.

Figure 6:
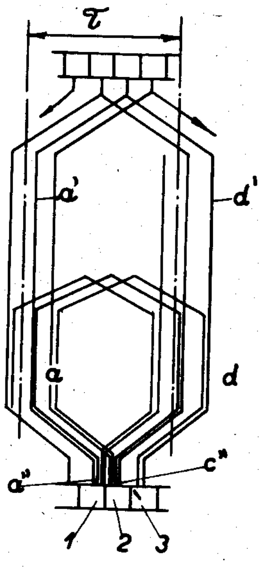
Figs. 6 and 7 illustrate further modifications of the winding of Fig. 1.
Figure 7:
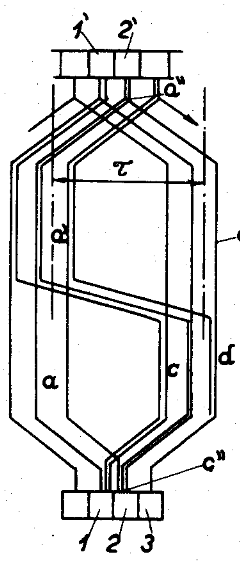

The points $a''$ and $c''$ in Fig. 5 may be moved along conductors $a$ or $a'$ and $c$ or $c'$ respectively for any desired distance. In Fig. 6, the junction $a''$ has been moved as far as segment 1, and $c''$ has been moved as far as segment 2. In Fig. 7$a''$ has been shifted as far as segment 2′ and $c''$ as far as segment 2.

Figure 8:
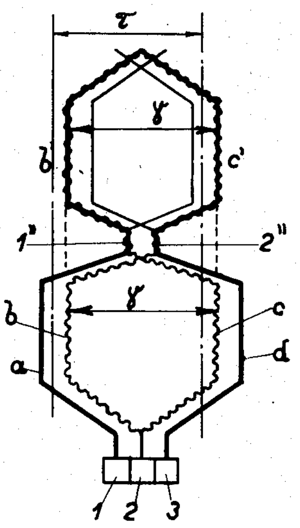
Fig. 8 is a view, similar to Fig. 1, showing a winding arrangement in which both halves of a winding section have the same pitch.
Figures 9, 10:
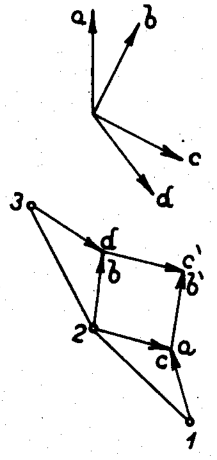
Fig. 9 is a voltage diagram relating to Fig. 8.
Fig. 10 is a vector voltage polygon relating to Fig. 8.

Fig. 8 shows a case of a winding according to the invention which differs from Fig. 1 in that the voltage across the circuit which looks like a figure 8 and which is shown in a wriggled line, equals zero as in Fig. 1, but this time because both coils, $-c+b$ and $c'-b'$ have the same pitch $\gamma$, whereas in Fig. 1 the lower half of the figure 8 had a pitch of $\tau-1$ the upper half having a pitch of $\tau+1$. With windings of the type shown in Fig. 8, a commutator may be connected to the back heads of the coils only if $\gamma=\tau$. Fig. 9 shows the voltage vectors of the conductors in Fig. 8. Fig. 10 is a vector diagram of the voltages of coil $ab'-c'-d$ and shows how conductor $-c$ divides the voltage across segments 1, 3 into 2 equal parts.

Figure 11:
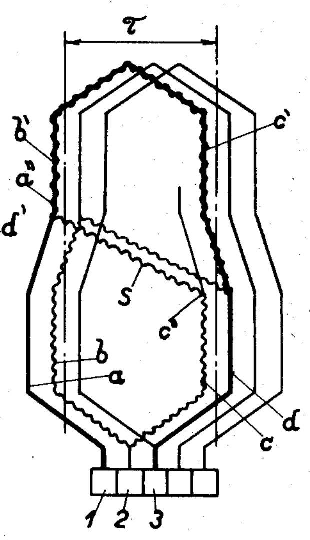
Figs. 11, 12 and 13 illustrate the windings of Figs. 5, 6 and 7, respectively, modified in accordance with the arrangement of Fig. 8.
Figure 12:
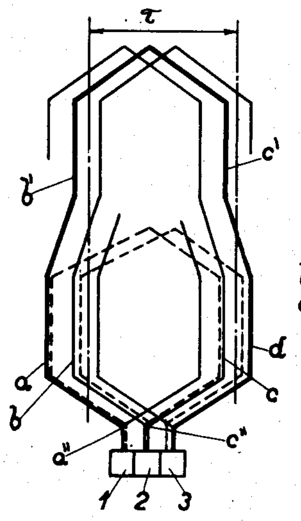
Figure 13:
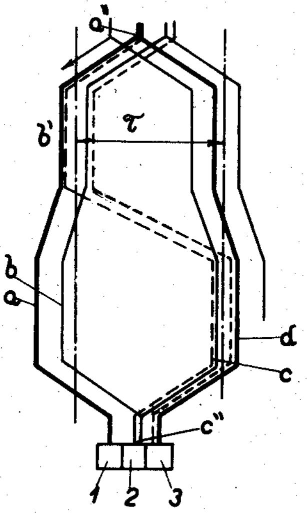

Fig. 11 illustrates the winding of Fig. 8 with the connections $s$ of Fig. 5. The connections $s$ can again be designed with a small cross-section, so that they do not take up much space. Figs. 12 and 13 show the winding of Fig. 8 with the junctions $a''$ and $c''$ shifted as in Figs. 6 and 7, respectively.

Figures 14, 15, 16, 17, 18:
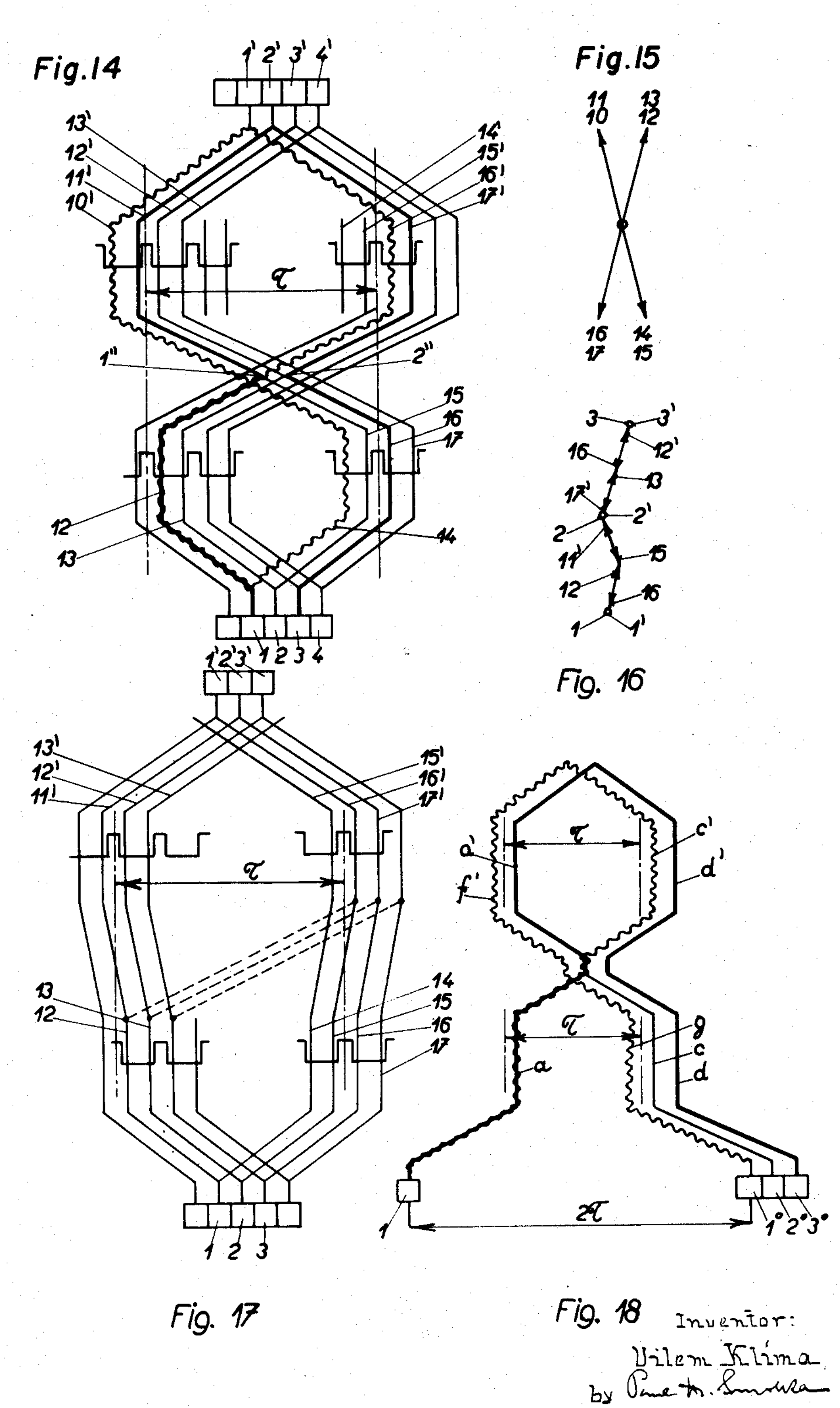
Fig. 14 illustrates the invention winding arrangement as applied to an armature construction, according to the invention, having two commutator segments per slot.
Fig. 15 is a voltage diagram related to Fig. 14.
Fig. 16 is a vector voltage polygon related to Fig. 14.
Fig. 17 illustrates the winding of Fig. 14 as modified in the manner shown in Fig. 5.
Figs. 18 through 22 illustrate winding arrangements including a wave winding on one armature section and a loop winding on the other.

Fig. 14 shows a winding on the principle of Fig. 1, but with 2 segments per slot. The winding is designed so that the circuits shaped like a figure 8, e. g. conductors +16′−10′−14+12, consist of two co-axial loops of pitches $\tau+1$ and $\tau-1$ respectively, so that the voltage across them equals zero. Fig. 15 shows the vectors of conductors 10′ to 17′ and 10 to 17 and Fig. 16 the vector polygon from which it is evident that the segment voltages across the commutator segments 1, 2, 3 and 1′, 2′, 3′ are equal. Fig. 17 illustrates the winding of Fig. 14 with the connectors of Fig. 5.

It is of course possible to combine two parallel wave windings or one wave and one lap winding. Fig. 18 shows an example of a design originating from Fig. 1. The markings correspond to each other as follows: The loop connected to segments 1, 2, 3 is changed into a wave in such a way that the ends of the coils are connected to segments 1°, 2°, 3°, which are separated by two pole distances, instead of being connected to segments 2, 3, etc. The wave winding is crossed.

The voltage induced in the circuit 1, $a$, $c'$, $f'$, $g$, 1° equals zero because the coil $c'$, $f'$ has a pitch prolonged by one slot and the coil ($g$, $a$) a pitch reduced by one slot, and since they are co-axial they have equal and opposite voltages which cancel each other. The circuit drawn in a wriggled line thus connects segments separated from each other by two pole distances, therefore we can omit the equalising connections. The wave winding is crossed.

Figures 19, 20:
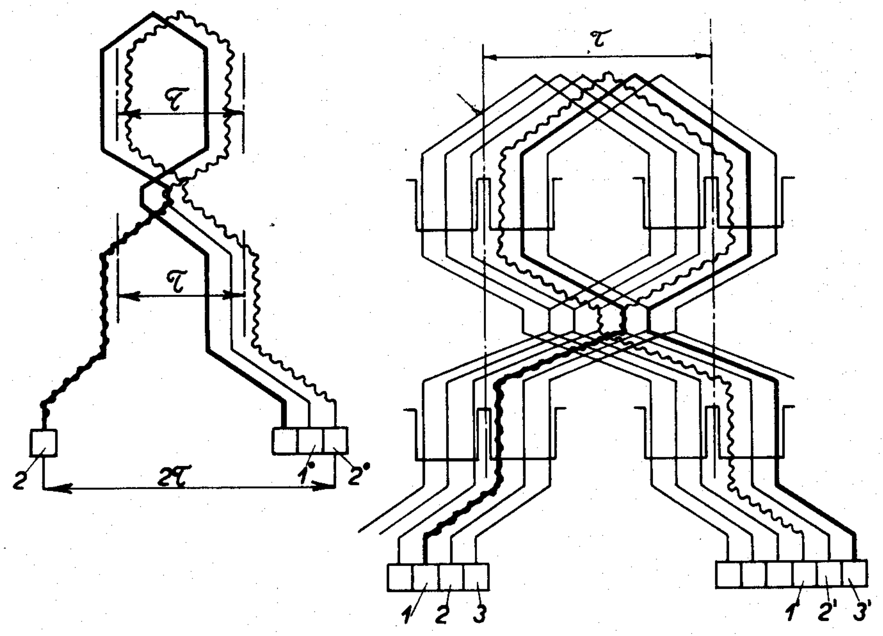

Fig. 19 shows a similar winding, but the wave winding is not crossed. Again the equalising connections may be omitted, for the voltage induced in the circuit shown in a wriggled line equals zero and therefore acts like an equalising connection.

Similarly windings as in Figs. 8 to 13 may be changed in the same way. Fig. 20, for instance, shows a combination of wave and lap winding for 3 segments per slot. The voltage across the circuit shown in a wriggled line equals zero.

Figure 21:
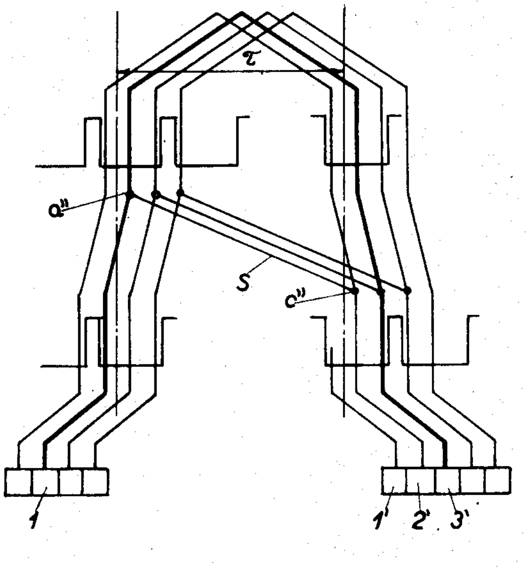

Fig. 21 shows the winding of Fig. 20 with the connectors $s$ of Fig. 5.

Figure 22:
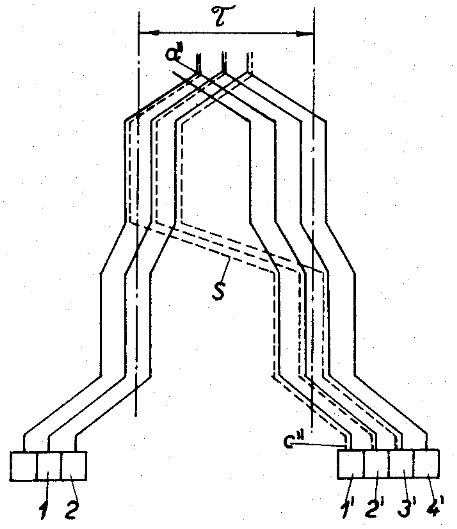

Fig. 22 shows a change of the connections $s$,

Points $a''$ and $c''$ are on the back ends of the coils and at the segments, respectively.

Figure 23:
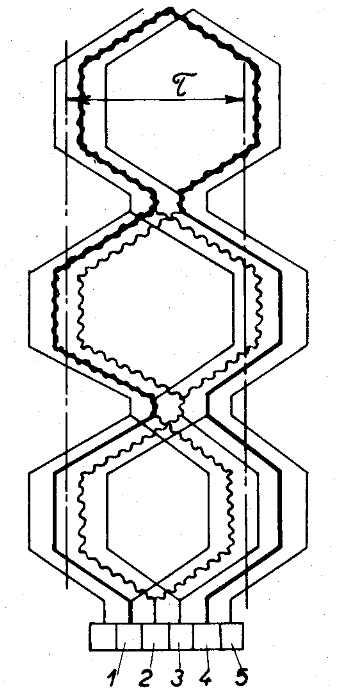
Figs. 23 and 24 illustrate an armature construction, according to the invention, including three axially spaced armature sections, and having a parallel triplex winding arranged on the three sections.

A parallel triplex winding can also be designed as shown in Fig. 23. Instead of the commutator segments 1', 2' etc. of Fig. 1 another loop is added at those points. (It could of course also be a wave.) As the coil leading from segment 1 to 3—drawn in a thick straight line—shows, a parallel triplex winding results. In the circuits drawn in a wriggled line, the induced voltage equals zero, so that no equalising currents flow in the machine. The volts per segment are constant.

Figure 24:
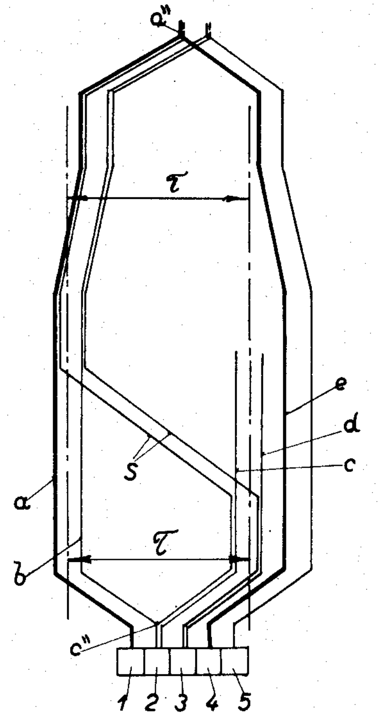

Fig. 24 is a modification of the winding of Fig. 23 similar to the modification of Fig. 1 shown in Fig. 7. The coil formed by 1, *a*, $a''$, the connection *s* (which leads back through the slot in which conductor *c* is placed) to segment 2, replaces the loop leading from segment 1 to segment 2 and thus secures the segment voltage and commutation.

I claim:

1. In a commutator type dynamo-electric machine, an armature comprising axially spaced sections substantially equal in length and having equal numbers of slots the slots of axially adjacent sections being in longitudinal alignment; at least one commutator mounted on said armature; and a winding arranged on said armature and comprising partial windings each arranged on one of said armature sections, and each having a number of branches equal to the number of poles of the machine and comprising conductors laid in said slots; the conductors of axially adjacent partial windings which lie in slots spaced by a pole pitch being connected in series to provide a multiplex winding throughout the entire axial length of said armature; said multiplex winding being connected to the segments of at least one commutator.

2. A dynamo-electric machine as claimed in claim 1 in which each conductor extends the full length of the armature in longitudinally aligned slots and the series connection between pole pitch spaced conductors of adjacent partial windings comprising equalizing connections having a cross-sectional area substantially less than that of said conductors.

3. A dynamo-electric machine as claimed in claim 1 in which the armature comprises two sections and including two commutators, one at each end of the armature; each partial winding having its branches connected to the segments of the adjacent commutator.

4. A dynamo-electric machine as claimed in claim 1, the series connection between pole pitch spaced conductors of adjacent partial windings comprising equalizing connections having a cross-sectional area substantially less than that of said conductors; said equalizing connections being disposed between adjacent armature sections.

5. A dynamo-electric machine as claimed in claim 1 including a single commutator; the series connection between pole pitch spaced conductors of adjacent partial windings comprising equalizing connections having a cross-sectional area substantially less than that of said conductors, and said equalizing connections lying in said slots and being connected to the conductors at the commutator segments to provide an independent winding on the armature adjacent the commutator.

6. A dynamo-electric machine as claimed in claim 1, the series connection between pole pitch spaced conductors of adjacent partial windings comprising equalizing connections having a cross-sectional area substantially less than that of said conductors; said equalizing connections lying in said slots and each connecting the rear end of a conductor of one partial winding to the front end of a conductor of the adjacent partial winding.

7. A dynamo-electric machine as claimed in claim 1 in which said partial windings are loop windings.

8. A dynamo-electric machine as claimed in claim 1 in which at least one partial winding is a loop winding and at least one partial winding is a wave winding.

VILÉM KLÍMA.

REFERENCES CITED

The following references are of record in the file of this patent:

UNITED STATES PATENTS

| Number | Name | Date |
|---|---|---|
| 573,009 | Lamme | Dec. 15, 1896 |
| 1,115,352 | Walker | Oct. 27, 1914 |
| 1,747,941 | Langlois | Feb. 18, 1930 |
| 2,288,408 | Lane | June 30, 1942 |
| 2,311,700 | Schwarz | Feb. 23, 1943 |
| 2,427,919 | Mironowicz | Sept. 23, 1947 |